(12) United States Patent
Luneack

(10) Patent No.: US 7,588,278 B1
(45) Date of Patent: Sep. 15, 2009

(54) TRAILER WORKSHOP

(76) Inventor: Richard M. Luneack, 282 Luneack La., Normandy, TN (US) 37360

( * ) Notice: Subject to any disclaimer, the term of this patent is extended or adjusted under 35 U.S.C. 154(b) by 156 days.

(21) Appl. No.: 11/862,327

(22) Filed: Sep. 27, 2007

(51) Int. Cl.
*B60J 7/00* (2006.01)
(52) U.S. Cl. .............. 296/24.32; 296/26.15; 108/44
(58) Field of Classification Search ........... 296/24.32, 296/26.15; 108/44
See application file for complete search history.

(56) References Cited

U.S. PATENT DOCUMENTS

| | | | |
|---|---|---|---|
| 3,667,799 A | 6/1972 | Shryock | 296/23 |
| 4,055,206 A | 10/1977 | Griffin | 144/285 |
| 5,383,703 A | 1/1995 | Irvine, III | 296/181 |
| 2006/0214446 A1 | 9/2006 | Johns | 296/24.32 |

*Primary Examiner*—Joseph D Pape
(74) *Attorney, Agent, or Firm*—Donald J. Ersler

(57) ABSTRACT

The trailer workshop includes a trailer, a work bench, a power tool and at least two pivot bases. The trailer includes at two wheels, hitch extension, a floor, a front wall, a rear wall, two side walls and a roof. A side door is created in one of the two side walls. A rear door is preferably created in the rear wall. The at least two pivot bases are mounted to the floor, adjacent the side door. The work bench is pivotally retained by the at least two pivot bases, such that when the work bench is in a substantially horizontal position, thereof extends outside the trailer. The side door is held above the work bench in a substantially horizontal position. The work bench includes a work piece support and a power tool support. The power tool is mounted to a top of the power tool support.

20 Claims, 5 Drawing Sheets

TRAILER WORKSHOP

BACKGROUND OF THE INVENTION

1. Field of the Invention

The present invention relates generally to trailers and more specifically to a trailer workshop, which enables an operator to modify elongated items, such as wood, metal, plastic and the like with protection from sun and rain.

2. Discussion of the Prior Art

U.S. Pat. No. 3,667,799 to Shryock discloses a camper kitchen and utility trailer. The Shryock patent includes a trailer for camping with partitions and shelving for the placement of utilities, chairs, bait, a sink and stove. U.S. Pat. No. 4,055,206 to Griffin discloses a composite shop trailer. The Griffin patent includes a shop trailer which can be folded into a compact size for transport and can be expanded during shop use. The shop trailer further includes material processing equipment mounted therein.

U.S. Pat. No. 5,383,703 to Irvine, III discloses a modular trailer. The Irvine, III patent includes a modular trailer utilizing a small trailer body capable of being pulled by the average passenger automobile. The trailer is provided with fold-out accessories such as a picnic table and trailering ramps. Patent application publication no. 2006/0214446 to Johns discloses a utility trailer. The Johns patent application includes a utility trailer for transporting and processing lumber, pipe and other materials. The workstation is pivotal between a folded configuration adjacent to the trailer frame for storage and or transport and a deployed, functional configuration extending from the trailer frame.

Accordingly, there is a clearly felt need in the art for a trailer workshop, which includes a work piece support for elongated items, such as wood, metal, plastic and the like and a power tool, such as a circle saw for sawing the elongated items with protection from sun and rain.

SUMMARY OF THE INVENTION

The present invention provides a trailer workshop, which enables an operator to modify elongated items. The trailer workshop includes a trailer, a work bench, a power tool and at least two pivot bases. The trailer includes at least two wheels, a hitch extension, a floor, a front wall, a rear wall, two side walls and a roof. The hitch extension extends from under the floor of the trailer. A side door is created in one of the two side walls. A rear door is preferably created in the rear wall. The at least two pivot bases are mounted to the floor, adjacent the side horizontal door. The work bench is pivotally retained by the at least two pivot bases, such that when the work bench is in a substantially horizontal position; the work bench is outside the trailer. The side door is held above the work bench in a substantially horizontal position, when the work bench is outside the trailer.

The work bench includes a work piece support, a power tool support, a work piece roller, a power tool roller and at least two ledgers. One end of a first ledger is secured to one end of the work piece support. One end of a second ledger is preferably mounted to the other end of the work piece support. One end of the power tool support is mounted below the other end of the work piece support. The work piece roller is rotatably retained on the other end of the work piece support. The power tool roller is rotatably retained on the other end of the power tool support. One end of a third ledger is preferably mounted to the other end of the power tool support. The other end of the first, second and third ledgers are retained by the at least two pivot bases. The power tool is preferably a circle saw. The circle saw is mounted to a top of the power tool support.

The at least two pivot bases include a pivot base and a locking pivot base. The pivot base includes a base plate, a support pedestal, a pair of pivot plates, a gas shock, a base yoke and a ledger yoke. The support pedestal is attached to the base plate. A single pivot plate is attached to each side of the support pedestal. A pivot pin is inserted through the pair of pivot plates and one of the ledgers to pivotally retain the ledger relative to the pivot base. The base yoke is attached to the base plate and the ledger yoke is attached to a bottom of one of the ledgers. One end of the gas shock is pivotally retained by the base yoke and the other end of the gas shock is pivotally retained by the ledger yoke. The locking pivot base includes the pivot base, a pair of lock plates and a lock pin. The pair of lock plates extend upward from the pair of pivot plates. The lock pin is inserted through the pair of pivot plates to lock the bench into a vertical storage position.

Accordingly, it is an object of the present invention to provide a trailer workshop, which includes a work piece support portion for elongated items and a power tool for modifying the elongated items.

Finally, it is another object of the present invention to provide a trailer workshop, which provides protection from sun and rain, while modifying elongated items.

These and additional objects, advantages, features and benefits of the present invention will become apparent from the following specification.

DETAILED DESCRIPTION OF THE PREFERRED EMBODIMENTS

Figure 1:
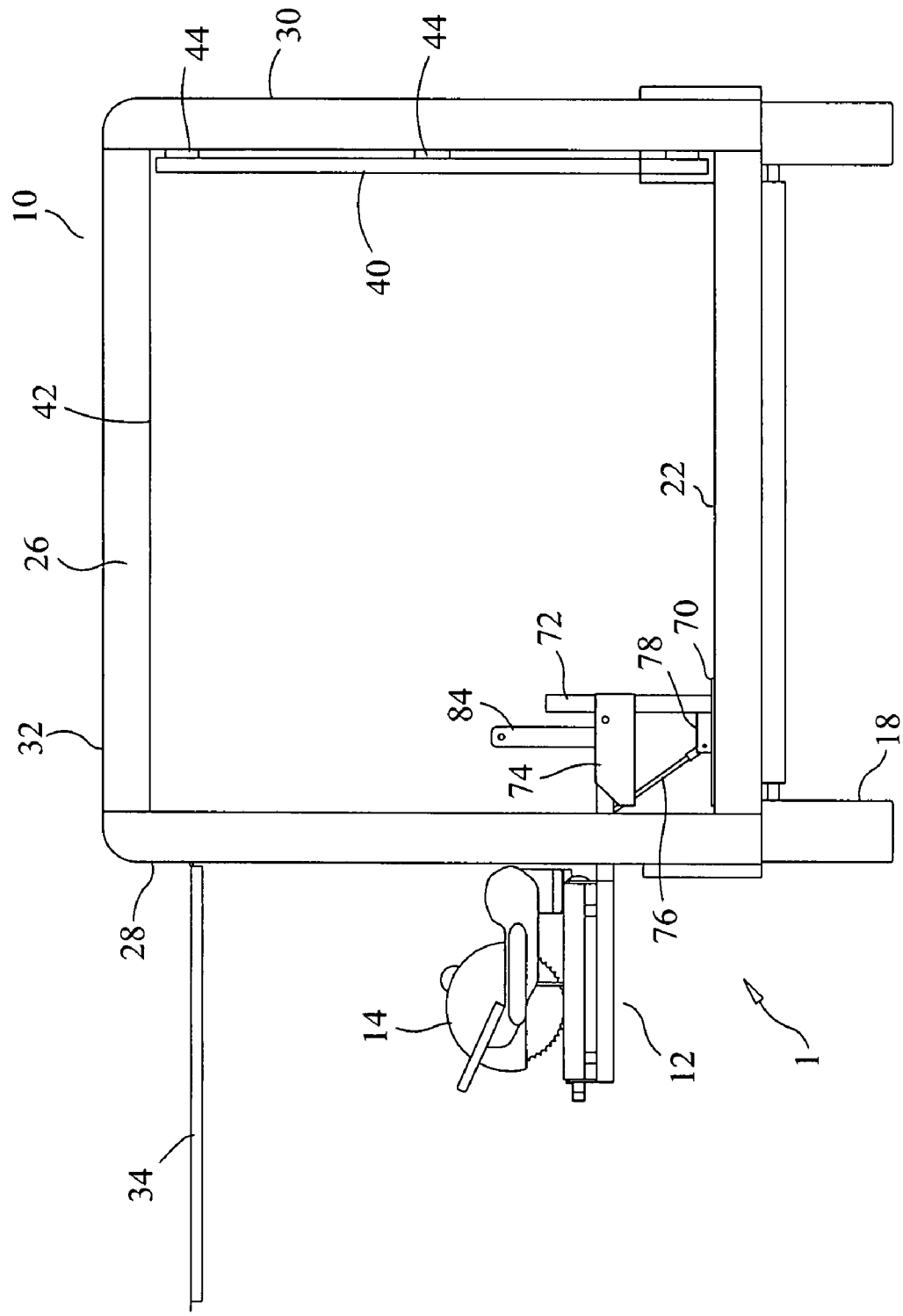
FIG. 1 is a rear view of a trailer workshop with a side door opened, a rear door opened and a work bench in a substantially horizontal position in accordance with the present invention.
Figure 2:
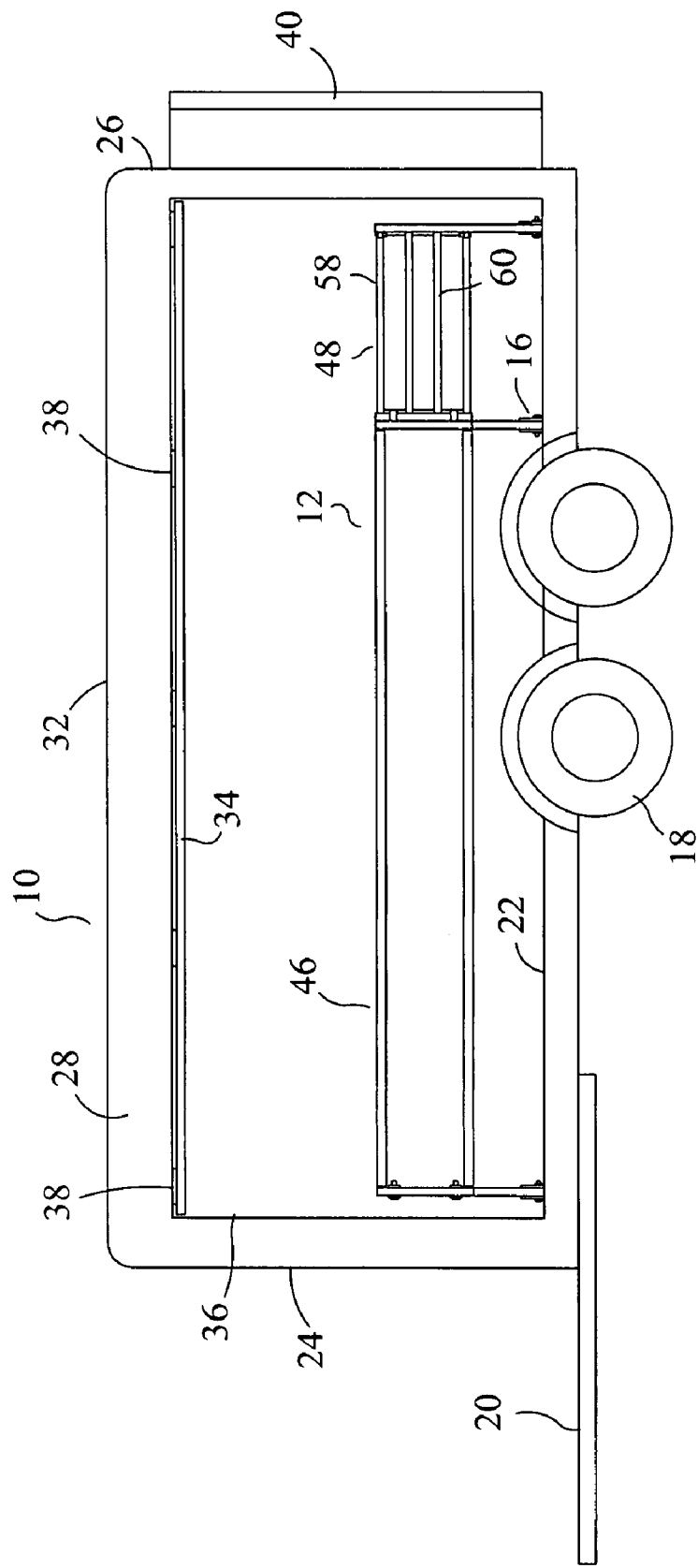
FIG. 2 is a side view of a trailer workshop with a side door opened, a rear door partially opened and a work bench in a vertical storage position in accordance with the present invention.
Figure 3:
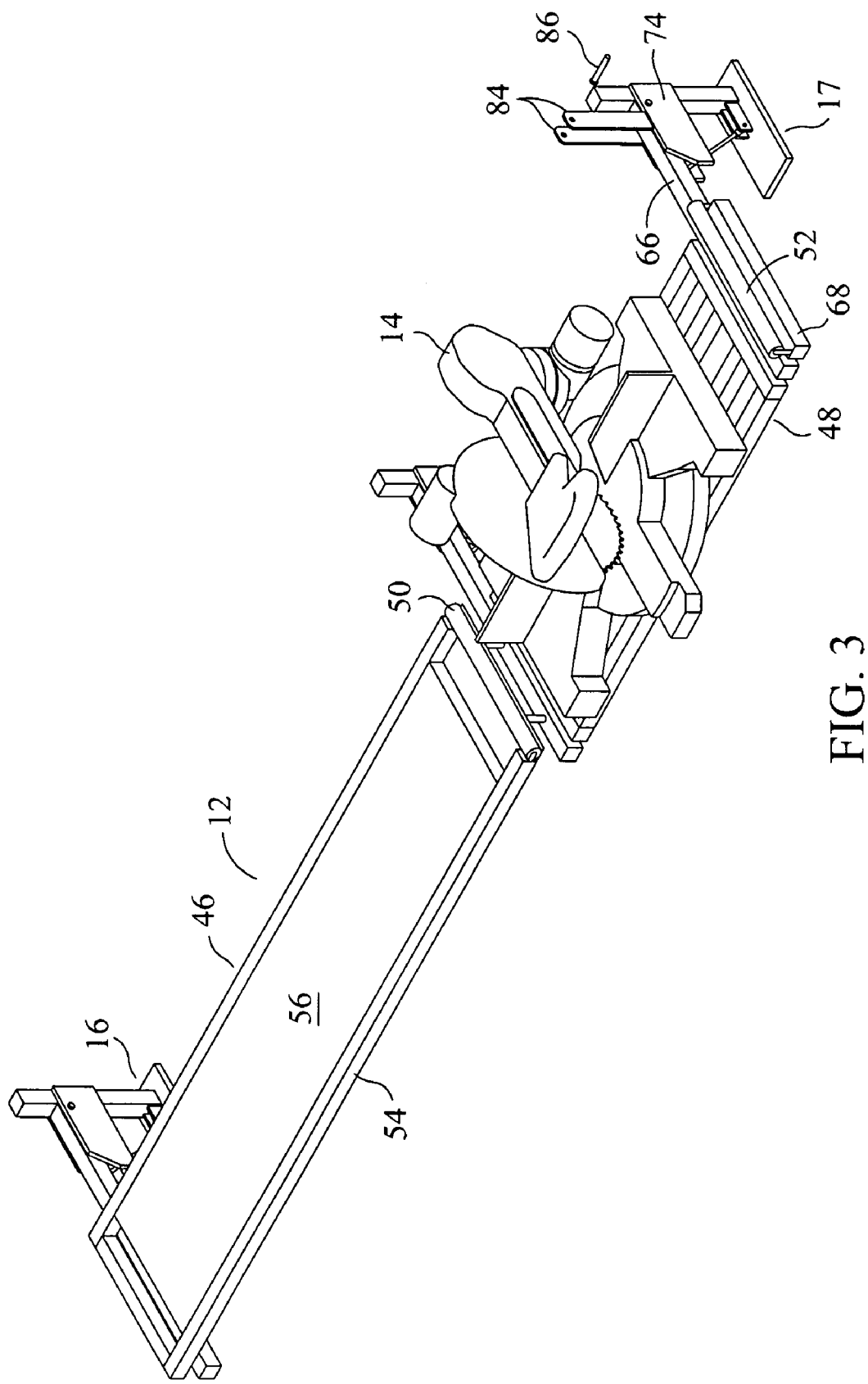
FIG. 3 is a perspective view of a work bench in a substantially horizontal position with a circle saw attached thereto of a trailer workshop in accordance with the present invention.
Figure 4:
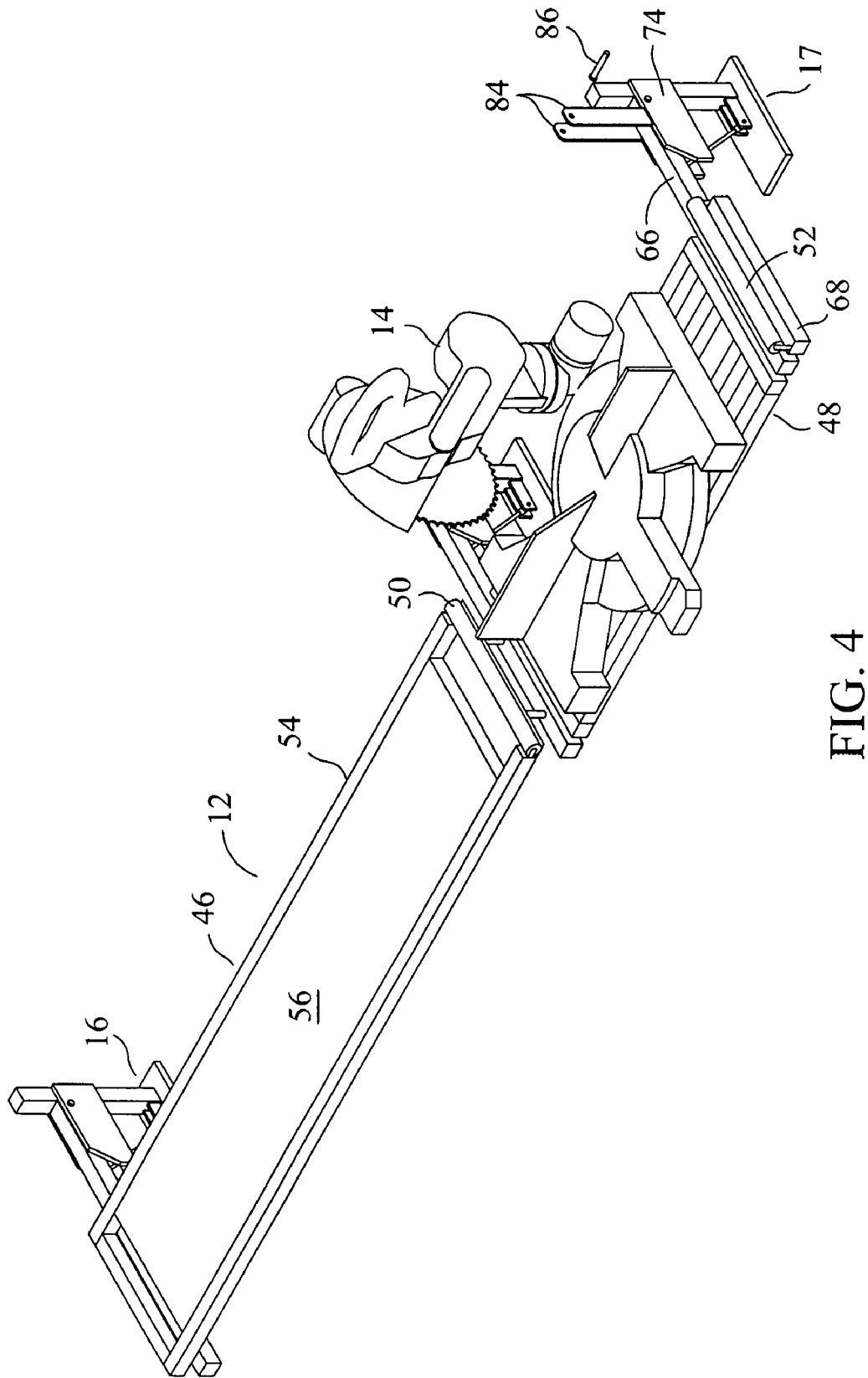
FIG. 4 is a perspective view of a work bench in a substantially horizontal position with a circle saw in a lifted position of a trailer workshop in accordance with the present invention.
Figure 5:
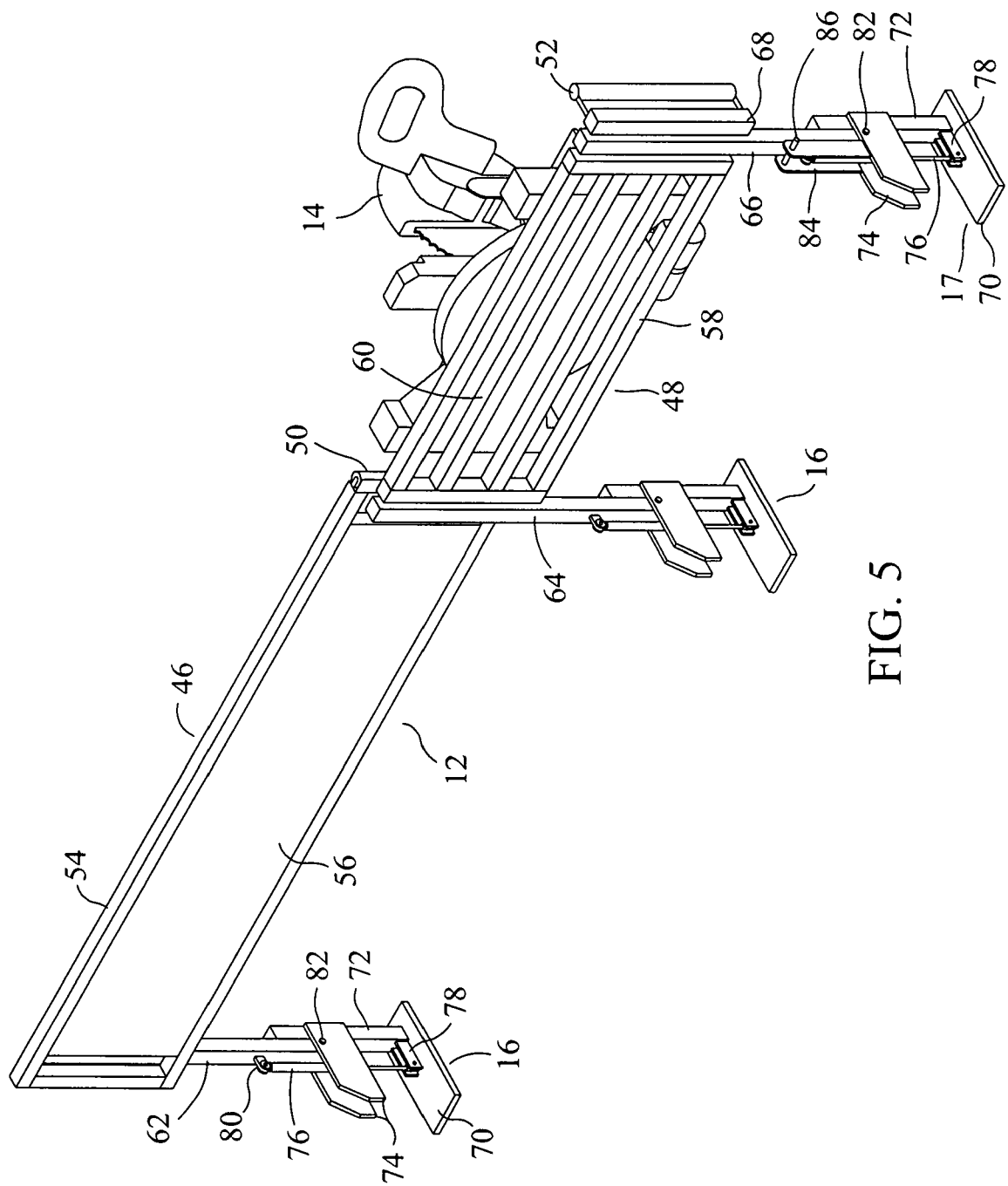
FIG. 5 is a perspective view of a work bench in a vertical storage position with a circle saw attached thereto of a trailer workshop in accordance with the present invention.

With reference now to the drawings, and particularly to FIG. 1, there is shown a rear view of a trailer workshop 1. With reference to FIGS. 2-5, the trailer workshop 1 includes a trailer 10, a work bench 12, a power tool and at least two pivot bases. The trailer 10 includes at least two wheels 18, a hitch extension 20, a floor 22, a front wall 24, a rear wall 26, a left side wall 28, a right side wall 30 and a roof 32. The hitch extension 20 extends from under a floor 22 of the trailer 10. Trailers are well known in the art and need not be explained in further detail. The side door 34 is installed in the left side wall 28. The side door 34 is retained in a side door opening 36 with at least one side hinge 38. The side door 34 is preferably retained in a substantially horizontal position with any suitable device (not shown). The substantially horizontal position of the side horizontal door 34 protects a user from sun and rain. The rear door 40 is installed in the rear wall 26. The rear door 40 is retained in a rear door opening 42 with at least one side hinge 44. The rear door 40 provides access to the interior of the trailer 10. The at least two pivot bases are mounted to the floor 22 with fasteners (not shown), adjacent the side door opening 36. The work bench 12 is pivotally retained by the at least two pivot bases, such that when the work bench 12 is in a substantially horizontal position, the work bench 12 extends substantially outside the trailer 10. The side horizontal door 34 is held above the work bench in a substantially horizontal position with any suitable method.

The work bench 12 includes a work piece support 46, a power tool support 48, a work piece roller 50, a power tool roller 52 and at least two ledgers. The work piece support 46 preferably includes a peripheral frame 54 and a support surface 56 retained inside the peripheral frame 54. The power tool support 48 preferably includes a peripheral frame 58 and at least two cross members 60 retained inside the peripheral frame 58. One end of a first ledger 62 is secured to one end of the work piece support 46. One end of a second ledger 64 is preferably mounted to the other end of the work piece support 46. One end of the power tool support 48 is mounted below the other end of the work piece support 46. The work piece roller 50 is rotatably retained on the other end of the work piece support 46. One end of a third ledger 66 is preferably mounted to the other end of the power tool support 48. A power tool roller mount 68 is attached to the third ledger 66. The power tool roller 52 is preferably rotatably retained on the power tool roller mount 68. The other end of the ledgers 62, 64, 66 are retained by the pivot bases. The power tool is preferably a circle saw 14, such as a cut-off circle saw. However, the power tool could be a router, drill press, planer or any other power tool mountable to the power tool support. The circle saw 14 is mounted to a top of the power tool support 48 with fasteners (not shown).

The at least two pivot bases include a pivot base 16 and a locking pivot base 17. The pivot base 16 includes a base plate 70, a support pedestal 72, a pair of pivot plates 74, a gas shock 76, a base yoke 78 and a ledger yoke 80. The support pedestal 72 is attached to the base plate 70 with fasteners, welding or any other suitable method. A single pivot plate 74 is attached to each side of the support pedestal 72 with welding or the like. A pivot pin 82 is inserted through the pair of pivot plates 74 and one of the ledgers 62, 64, 66 to pivotally retained the ledgers 62, 64, 66 relative to the pivot base 70. The base yoke 78 is attached to the base plate 70 and the ledger yoke 80 is attached to a bottom of one of the ledgers 62, 64, 66. One end of the gas shock 76 is pivotally retained by the base yoke 78 and the other end of the gas shock 76 is pivotally retained by the ledger yoke 80.

The locking pivot base 17 includes the pivot base 16, a pair of lock plates 84 and a lock pin 86. The pair of lock plates 84 extend upward from the pair of pivot plates 74. The lock pin 86 is inserted through the pair of pivot plates 84 to lock the bench 12 into a vertical storage position.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:
1. A trailer workshop comprising:
a trailer having a side opening door retained in a side door opening;
a work bench including a work piece support and a power tool support; and
means for pivotally retaining said work bench in a substantially horizontal position substantially outside the trailer and in a substantially vertical position inside the trailer, said work bench pivoting through said side door opening.
2. The trailer workshop of claim 1, further comprising:
a rear door being retained in a rear of said trailer.
3. The trailer workshop of claim 1, further comprising:
at least two ledgers extending from said work bench.
4. The trailer workshop of claim 3, further comprising:
said means for pivotally retaining said work bench being at least two pivot bases, said at least two pivot bases pivotally retaining said at least two ledgers.
5. The trailer workshop of claim 3, further comprising:
each two of said at least one pivot bases including a bases plate, a support pedestal and a pair of pivot plates, said support pedestal extending upward from said base plate, said pair of pivot plates being attached to opposing sides of said pedestal, one of said at least two ledgers being retained between said pair of pivot plates.
6. The trailer workshop of claim 1, further comprising:
a power tool being mounted to said power tool support.
7. The trailer workshop of claim 6 wherein:
said power tool being a circle saw.
8. The trailer workshop of claim 1 wherein:
said side opening door being retained in a substantially horizontal position.
9. A trailer workshop comprising:
a trailer having a side opening door, said side opening door being retained in a substantially horizontal position;
a work bench including a work piece support and a power tool support; and
means for pivotally retaining said work bench in a substantially horizontal position substantially outside the trailer and in a substantially vertical position inside the trailer, said work bench pivoting through said side door opening.
10. The trailer workshop of claim 9, further comprising:
a rear door being retained in a rear of said trailer.
11. The trailer workshop of claim 9, further comprising:
at least two ledgers extending from said work bench.
12. The trailer workshop of claim 11, further comprising:
said means for pivotally retaining said work bench being at least two pivot bases, said at least two pivot bases pivotally retaining said at least two ledgers.
13. The trailer workshop of claim 12, further comprising:
each two of said at least one pivot bases including a bases plate, a support pedestal and a pair of pivot plates, said support pedestal extending upward from said base plate, said pair of pivot plates being attached to opposing sides of said pedestal, one of said at least two ledgers being retained between said pair of pivot plates.
14. The trailer workshop of claim 9, further comprising:
a work piece roller being retained on one end of said saw support and a saw roller being retained on the other end of said saw support.
15. The trailer workshop of claim 9 wherein:
a power tool being mounted to said power tool support.
16. A trailer workshop comprising:
a trailer having a side opening door retained in a side door opening;

a work bench including a work piece support and a power tool support; and at least two pivot bases pivotally retaining said work bench in a substantially horizontal position substantially outside the trailer and in a substantially vertical position inside the trailer, said work bench pivoting through said side door opening.

17. The trailer workshop of claim 16, further comprising:

a power tool being mounted to said power tool support.

18. The trailer workshop of claim 16, further comprising:

at least two ledgers extending from said work bench, said at least two pivot bases pivotally retaining said at least two ledgers.

19. The trailer workshop of claim 18, further comprising:

each two of said at least one pivot bases including a bases plate, a support pedestal and a pair of pivot plates, said support pedestal extending upward from said base plate, said pair of pivot plates being attached to opposing sides of said pedestal, one of said at least two ledgers being retained between said pair of pivot plates.

20. The trailer workshop of claim 16 wherein:

said side opening door being retained in a substantially horizontal position.

\* \* \* \* \*